United States Patent [19]

Willis

[11] 4,206,900

[45] Jun. 10, 1980

[54] VALVE OPERATOR

[75] Inventor: Gordon A. Willis, Canoga Park, Calif.

[73] Assignee: Borg-Warner Corporation, Chicago, Ill.

[21] Appl. No.: 820,651

[22] Filed: Aug. 1, 1977

[51] Int. Cl.² .................... F16K 31/143; F16K 31/50
[52] U.S. Cl. ................................. 251/14; 92/75; 92/76; 251/31; 251/58; 251/229; 251/280
[58] Field of Search ............... 74/424.8 B, 424.8 VA; 251/14, 31, 229, 280, 58; 137/556; 92/50, 69, 75, 76

[56] References Cited

U.S. PATENT DOCUMENTS

| | | | |
|---|---|---|---|
| 535,614 | 3/1895 | Corey, Jr. | 251/280 |
| 872,369 | 12/1907 | Rankin | 92/75 |
| 1,007,275 | 10/1911 | Desmond . | |
| 1,532,029 | 3/1925 | Bobbitt | 92/75 |
| 1,603,005 | 10/1926 | Flam . | |
| 1,627,658 | 5/1927 | Mauss | 92/75 |
| 2,042,906 | 6/1936 | McElwaine | 92/76 |
| 2,344,594 | 3/1944 | Bryant | 251/280 |
| 2,354,987 | 8/1944 | Fawkes | 251/280 |
| 2,370,604 | 2/1945 | DeCraene et al. | 251/280 |
| 2,885,172 | 5/1959 | Natho | 251/14 |
| 2,890,014 | 6/1959 | Luoma et al. | 251/14 |
| 2,908,477 | 10/1959 | Buri | 251/14 |
| 3,452,766 | 7/1969 | Fenster | 137/556 |
| 3,643,688 | 2/1972 | Meinert | 137/556 |
| 3,801,062 | 4/1974 | Arn et al. | 251/14 |
| 3,958,493 | 5/1976 | Fujita et al. | 251/31 |
| 3,971,542 | 7/1976 | Lee | 251/58 |
| 4,029,289 | 6/1977 | Miffre | 251/58 |
| 4,050,670 | 9/1977 | Borg et al. | 251/229 |
| 4,141,534 | 2/1979 | Goga et al. | 251/58 |

FOREIGN PATENT DOCUMENTS

| | | |
|---|---|---|
| 2636117 | 2/1977 | Fed. Rep. of Germany .............. 92/69 |
| 968477 | 11/1950 | France ..................................... 251/280 |
| 1285515 | 8/1972 | United Kingdom . |
| 1365026 | 8/1974 | United Kingdom . |
| 1373070 | 11/1974 | United Kingdom . |
| 1476069 | 6/1977 | United Kingdom . |

OTHER PUBLICATIONS

Masoneilan International, Inc. "The EF System of Control Valves"—1976—Bulletin No. 377E.

Primary Examiner—Martin P. Schwadron
Assistant Examiner—G. L. Walton
Attorney, Agent, or Firm—Aubrey L. Burgess

[57] ABSTRACT

An actuator for actuating valves and the like which comprises a pair of opposed cylinders, the axes of which are generally perpendicular to a valve stem. Pistons in the cylinders are connected to the valve stem by toggle links, the pistons being resiliently urged toward the center of the assembly which corresponds to a closed valve position. To open the valve, a fluid, such as air, is introduced between the pistons, so as to move them away from their rest (valve closed) positions. A handwheel is provided to manually open the valve by moving the pistons from their rest positions.

A solenoid controlled pneumatic valve may be used to control the supply of air to the actuator. Either a failure in air pressure or an electrical failure will result in the pistons being urged to the rest positions and also result in closing the connected valve, i.e., the failure mode.

3 Claims, 4 Drawing Figures

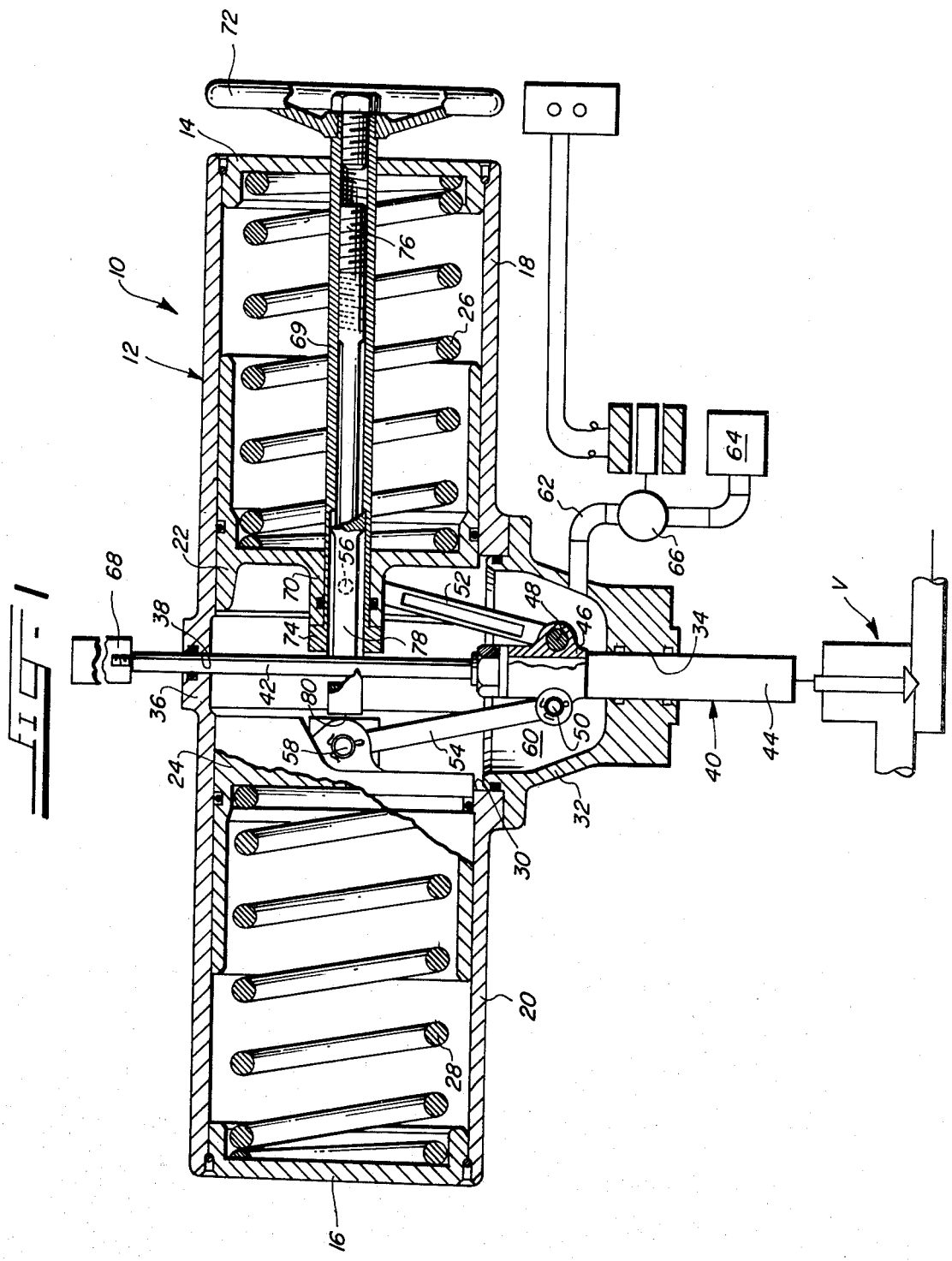

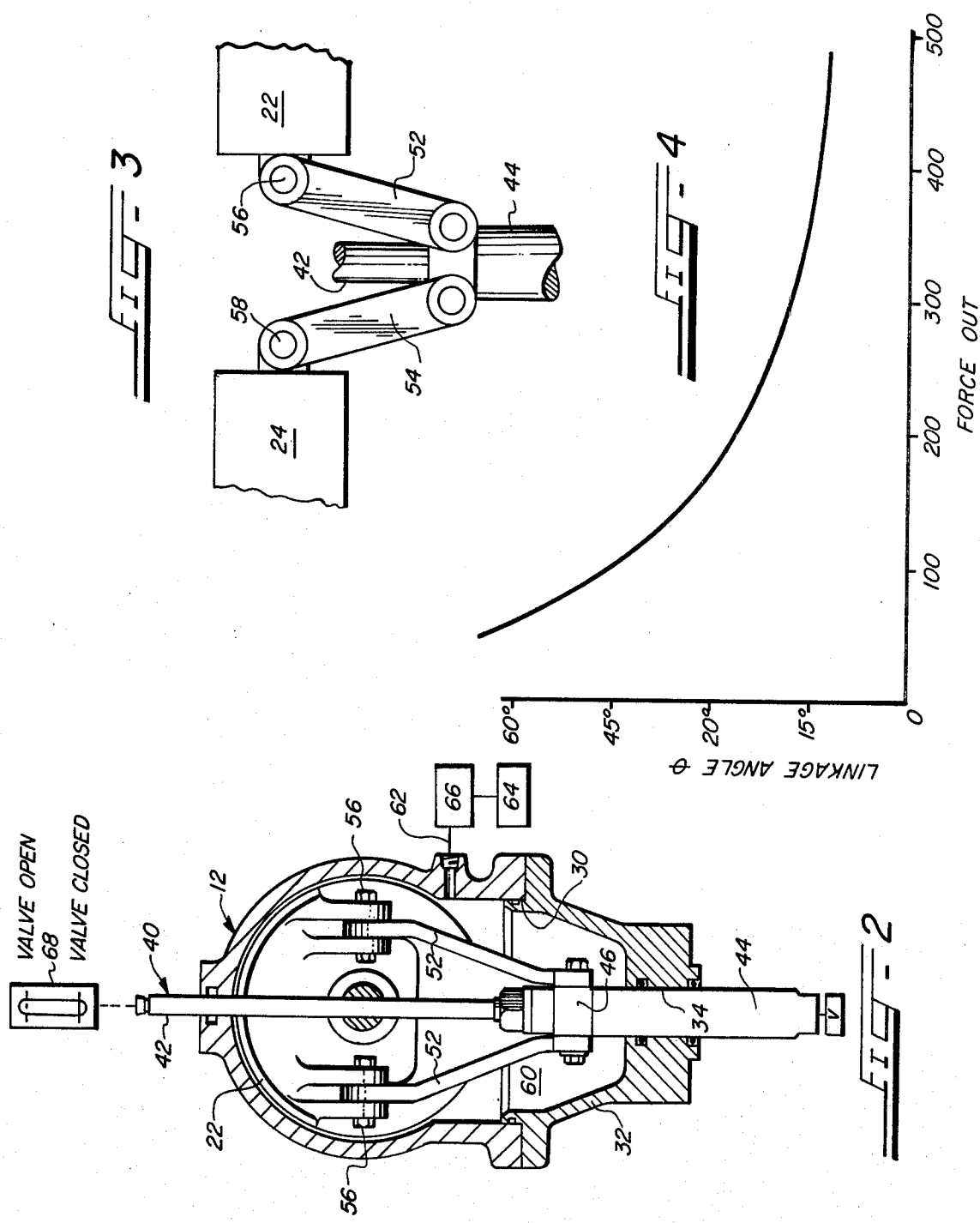

VALVE OPERATOR

BACKGROUND OF THE INVENTION

Fluid actuated operators associated with valves are known in the art. At least some of the prior art actuators used spring and pistons where the maximum spring load occurred when the valve is in its closed position. Other prior art teachings for valve actuators use pistons but omit spring means urging the pistons in a given direction.

Still other valve operating mechanisms use toggle links to increase output force as compared to input force. Examples of these are described in U.S. Pat. Nos. 1,007,275; 1,603,005; 2,354,987 and 2,370,604.

Another device incorporates a toggle link associated with a pneumatic type diaphragm to actuate valves, this also incorporates a manual override and is described in Bulletin No. 377E (copyrighted 1976) and entitled "The ΣF System of Control Valves" of Masoneilan International, Inc., Norwood, Mass. 02062.

THE INVENTION

In the valve actuators according to this invention, a pair of opposed pistons are urged toward each other by coil springs and the motion is translated by toggle links to a valve stem or operator arranged perpendicular to the axis of the pistons. To open the valve, a fluid, such as air, is introduced into a zone between the pistons, moving the pistons away from each other against the spring forces and translating the motion to the valve stem or operator rod by the toggle links.

A solenoid operated valve is ideal to control the supply of the air to the operator; failure of the air supply or electrical failure will result in the springs urging the pistons toward the center and the closing of the connected valve.

Manual operation and override can also be accomplished by using a screw connected to the pistons and operating the screw by a handwheel.

The operating rod can be connected to a visual indicator or a position switch to indicate the open or closed positions of the valve.

THE DRAWINGS

FIG. 1 is a sectional elevational view of the apparatus of this invention;

FIG. 2 is a sectional view taken on lines 2—2 of FIG. 1;

FIG. 3 is a graphic representation of the force output using this invention; and FIG. 4 is a typical output curve for the structure shown in FIG. 3

DETAILED DESCRIPTION

Attention is invited to the drawings and especially FIGS. 1 and 2 wherein a fluid or pneumatic valve operator 10, built according to this invention is illustrated. The operator 10 comprises a generally cylindrical body 12 having closure-spring holders or end caps 14, 16 at the ends, there thus being formed a pair of opposed cylinders 18 and 20. Pistons 22 and 24 are received in the respective cylinders 18 and 20 and each is urged toward the other by a coil spring 26 and 28, respectively.

Centrally of the body 12 is an opening 30 to which a depending adaptor 32 is connected. The adaptor 32 can be bolted or otherwise connected to the body 12 and is provided with a central opening 34 which acts as a bearing to stabilize the system. The opposed portion of the body 12 is provided with a thickened portion 36 and a central opening 38.

A valve operating rod or shaft generally identified as 40 passes through the openings 34, 36. The rod 40 comprises a portion 42 of one diameter slidable in the opening 36 and another larger portion 44 slidable in the opening 34. A clevis 46 is retained on the shaft 40 and the shaft 40 is connected to the valve V, as is indicated by broken lines in the drawing. The clevis 46 is retained on the shaft 40 by a nut 47; it does not prevent the shaft 40 from rotating. The clevis 46 is provided with trunions 48, 50 to which are connected toggle links 52, 52, 54, 54. The toggle links 52, 52, 54, 54 are connected at their opposite ends by trunions 56, 56, 58, 58 on the pistons 22, 24, respectively.

A fluid, generally air, can be introduced into the chamber 60 formed by the adaptor 32 and between the pistons 22, 24 and into the central part of the body 12 through a conduit 62 from a source indicated at 64. A two-way valve means 66 is in the conduit 62 to control the supply of air to and from the chamber 60. Preferably this is a solenoid valve which can be operated from a remote location. A visual indicator or a position switch 68 is connected to the shaft 40 which extends beyond the body 12.

Introduction of air from the source 64 through the solenoid 66 into the chamber 60 at sufficient pressure acts on the pistons 22, 24 and moves them, against the force of the springs 26, 28, away from center. The shaft 40 is axially raised because of the toggle links 52, 54 and the valve V is opened. Exhaust of air from the chamber 60 reverses the action. In the event of failure of the air source or electric supply, the springs 26, 28 force the pistons 22, 24 toward each other and the valve V is closed.

A manual override for the solenoid-operated operator is provided, as will now be described. A hollow, internally threaded and rotatable shaft 69 passes through the cap 14 and through a sleeve 70 of the piston 22. The shaft 69 has a handwheel 72 attached at one end and an enlarged end 74 at the other to thus be retained in position. An externally threaded shaft 76 is received in the shaft 69 and has an elongated slot 78 at its external end, which slot permits the passage of the valve operating shaft 40 and prevents the shaft 76 from turning. The terminal end 80 of the shaft 76 abuts the piston 24; by turning the handwheel 72 in the proper direction, the rod 76 moves toward the piston 24, against the force of the spring 28. The backward (balancing force) moves external shaft enlarged end 74 and thus through the toggle links 52, 54, raises the shaft 40 and opens the valve V.

Wherever necessary, O ring seals and/or gaskets and the like are provided.

The structural arrangement provides a system which generates the largest forces when the shaft 40 is in the valve (V) closed position, i.e., when the spring forces the pistons to their rest positions (as in FIG. 1). A typical output curve as a percentage of input (input force being constant) is illustrated in FIG. 4 wherein linkage angle (see FIG. 3) is plotted against output force. Thus the system is a fail safe one—the valve is closed with authority upon failure of supply—either pneumatic or electrical.

I claim:

1. A valve operator comprising:
   a pair of opposed cylinders joined together and defining a piston chamber;
   a piston in each cylinder, said pistons being movable between positions closely adjacent one another to spaced from each other corresponding respectively to normally closed valve positions and open valve positions;
   a pair of coil springs, one for each piston and located outwardly of said pistons for urging said pistons toward one another and to their normally closed valve positions;
   a valve operating rod movable normal to the axis of said cylinders between a normally closed valve position and an open valve position;
   means comprising toggle links connecting said pistons and said rod;
   means to supply a pneumatic fluid to said piston chamber and between said pistons to counter said coil springs and to move said pistons and thus the rod through said toggle links toward the open valve position; and
   a second rod having one end abutting one of said pistons and extending through the other of said pistons and means for axially moving said second rod to move said abutting piston against the force of said coil springs toward the valve open position in the event of failure of the pneumatic fluid supply.

2. A valve operator as recited in claim 1 wherein said means for moving said second rod comprises a hollow shaft through which said second rod passes, said hollow shaft being supported at one end by one of said pistons and at the other end by one of said cylinders, and further comprising external threads on said second rod mating with internal threads on the interior of said hollow shaft.

3. A valve operator as recited in claim 2 wherein said hollow shaft is rotationally supported by said one of said pistons and by said one of said cylinders and further comprising a manually operated handle connected at the exterior of the supporting cylinder for rotating said hollow shaft to thereby axially move said second rod.

* * * * *